United States Patent [19]

Mizuhara

[11] Patent Number: 4,719,081
[45] Date of Patent: Jan. 12, 1988

[54] PALLADIUM ALLOY FOR JOINING CERAMICS AND METHOD OF USE

[75] Inventor: Howard Mizuhara, Hillsborough, Calif.

[73] Assignee: GTE Products Corporation, Stamford, Conn.

[21] Appl. No.: 940,893

[22] Filed: Dec. 12, 1986

[51] Int. Cl.$^4$ .................................................. C22C 5/04
[52] U.S. Cl. .............................. 420/463; 228/263.12; 428/606
[58] Field of Search ...................... 420/463, 464, 465; 428/606; 228/121, 263.12

[56] References Cited

U.S. PATENT DOCUMENTS 3,277,150 10/1966 Rhys et al. ........................... 420/463
4,447,391 5/1984 Mizuhara .............................. 420/463

Primary Examiner—L. DeWayne Rutledge
Assistant Examiner—Robert L. McDowell
Attorney, Agent, or Firm—James Theodosopoulos

[57] ABSTRACT

An alloy for joining ceramics has the following composition, by weight: 65 to 98% palladium; 1 to 20% nickel; 0.5 to 20% chromium; 0.5 to 10% titanium or zirconium; 0 to 10% molybdenum.

12 Claims, No Drawings

PALLADIUM ALLOY FOR JOINING CERAMICS AND METHOD OF USE

This invention concerns an alloy for joining ceramics. The alloy can be used at high temperatures, is oxidation resistant, and is ductile. Palladium is the main constituent of the alloy. For wetting ceramics, the alloy contains titanium or zirconium as the reactive metal.

Prior art patents which disclose palladium and titanium or zirconium alloys for joining ceramics are U.S. Pat. Nos. 3,155,499, 3,813,759 and 4,447,391 and Canadian Pat. No. 756,538.

U.S. Pat. No. 3,955,499 discloses a brazing alloy containing 30–35% Cr, 16–19% Pd, 4–6% Si, 1.1–3% Ti, 1–2.5% Al, balance nickel. This alloy is not ductile enough to be rolled into foil and is not useable at temperatures as high as is the alloy of the instant invention.

U.S. Pat. No. 3,813,759 discloses a brazing alloy for brazing silicon carbide or dense carbon. The alloy contains at least 5 atomic percent silicon and at least one of the metals germanium, iron, gold, nickel, palladium, platinum, chromium, titanium. The alloy is not ductile; instead, it is designed to match the thermal expansion characteristics of the silicon carbide or dense carbon.

U.S. Pat. No. 4,447,391 discloses a brazing alloy containing about 0.1 to 5% titanium, 15 to 85% nickel, 51 to 83% gold or gold and platinum, 0.05 to 4% boron, 0 to 4% silicon and 0 to 30% chromium. This alloy is not useable at temperatures as high as is the alloy of the present invention.

Canadian Pat. No. 756,358 discloses a three component brazing alloy consisting of 30 to 75% palladium, 2 to 9% titanium, balance of 16 to 68% nickel. However, the four component alloy of the instant invention is more oxidation resistant. Furthermore, this four component alloy can withstand a higher temperature. The highest liquidus temperature for the alloys of the Canadian patent is less than about 1300° C. In contrast, the liquidus temperature for the alloy systems of the instant invention is above 1300° C.

SUMMARY OF THE INVENTION

An alloy as per this invention has the following composition, by weight: 65 to 98% palladium; 1 to 20% nickel; 0.5 to 20% chromium and 0.5 to 10% titanium or zirconium. The alloy may optionally contain 0 to 10% molybdenum. The alloy is ductile enough to be rolled into foil and satisfactorily join materials having different thermal expansion characteristics. In addition, the alloy has a liquidus temperature higher than about 1300° C.

This invention differs from that disclosed in my U.S. Pat. No. 4,604,328 in that (1) palladium is the only precious metal used, (2) the palladium content is generally greater, and (3) the liquidus temperature is generally higher.

EXAMPLE 1

An alloy of 83 Pd, 10 Cr, 5 Ni, 2 Ti was prepared by arc melting on water cooled hearth. The alloy button was rolled down to 2 mil foil under two intermediate annealings.

The 2 mil alloy foil was placed between SNW-2000 silicon nitride substrates with 50 gram load. The assembly was placed in a GCA vacuum furnace and heated to 1420° C. under $10^{-5}$ Torr vacuum. The alloy showed some blushing over the ceramic but the ceramic-alloy-ceramic joint was excellent.

The brazed assembly was air fired in an electric kiln at 1000° C. for 72 hours and the brazing alloy showed slight oxidation but no spalling.

EXAMPLE 2

An alloy consisting of 93 Pd, 4% Ni, 1% Cr, 2% Ti was prepared and rolled down to 2 mil foil as in Example 1.

The foil was sandwiched between two flat silicon nitride substrates 1.1"×1.1"×0.060" in dimension with 100 gram loading. The assembly was heated to 1520° C. under $10^{-5}$ Torr vacuum and cooled. The brazed joint showed excellent braze alloy wetting with some blushing.

The substrate was smashed and broken into few pieces but the joint held together.

EXAMPLE 3

An alloy of 78% Pd, 5% Cr, 10% Ni, 6% Mo, 1% Ti was used to braze 99.5% alumina to 99.5% alumina at 1410° C. under $10^{-5}$ Torr vacuum. An excellent brazed joint resulted.

EXAMPLE 4

An alloy consisting of 74% Pd, 4% Cr, 20% Ni, 2% Ti was prepared by skull melting, followed by rolling the button to 3 mil thickness foil. The foil was then sandwiched between 2 silicon carbide substrates ¾"×¾"×⅛". The assembly was vacuum brazed at $10^{-5}$ Torr at 1345° C. temperature and cooled. The joint was sound and could not be parted across the brazed joint.

EXAMPLE 5

Similar to Example 4 but zirconium was used in place of titanium. The braze carried out at 1350° C. showed excellent properties.

The following table shows the liquidus temperature of nine alloy compositions within this invention. The compositions are in terms of weight percent.

| Sample | Pd | Cr | Ni | Mo | Ti | Liquidus Temperature |
|---|---|---|---|---|---|---|
| A | 74 | 4 | 20 | | 2 | 1328° C. |
| B | 74 | 14 | 10 | | 2 | 1381° C. |
| C | 74 | 19 | 5 | | 2 | 1331° C. |
| D | 83 | 10 | 5 | | 2 | 1392° C. |
| E | 83 | 5 | 10 | | 2 | 1400° C. |
| F | 93 | 1 | 4 | | 2 | 1513° C. |
| G | 70 | 4 | 19 | 5 | 2 | 1320° C. |
| H | 78 | 5 | 10 | 6 | 1 | 1390° C. |
| I | 74 | 4 | 20 | | 2 Zr | 1335° C. |

The high palladium content of the alloy permits the alloy to both meet ductility requirements and have good oxidation resistance. Molybdenum can be added to increase high temperature creep resistance.

Examples of ceramics that can be joined with the alloys of this invention are alumina, silicon nitride, sialon and silicon carbide.

I claim:

1. An alloy for joining ceramics consisting of the following composition by weight: 65 to 98% palladium; 1 to 20% nickel; 0.5 to 20% chromium; 0.5 to 10% titanium or zirconium; 0 to 10% molybdenum, the composition having a liquidus temperature above 1300° C.

2. The alloy of claim 1 wherein the alloy is in the form of a foil.

3. The method of joining ceramic materials using the alloy of claim 1 by vacuum heating the alloy above its liquidus temperature.

4. An alloy foil in accordance with claim 2 having the composition 83% Pd, 10% Cr, 5% Ni; 2% Ti.

5. An alloy foil in accordance with claim 2 having the composition 93% Pd, 4% Ni, 1% Cr, 2% Ti.

6. An alloy foil in accordance with claim 2 having the composition 78% Pd, 5% Cr, 10% Ni, 6% Mo, 1% Ti.

7. An alloy foil in accordance with claim 2 having the composition 74% Pd, 4% Cr, 20% Ni, 2% Zr.

8. The method of joining two pieces of silicon nitride by vacuum brazing at 1420° C. using the foil of claim 4.

9. The method of joining two pieces of silicon nitride by vacuum brazing at 1520° C. using the foil of claim 5.

10. The method of joining two pieces of alumina by vacuum brazing at 1410° C. using the foil of claim 6.

11. The method of joining ceramics using the foil of claim 7 by vacuum heating the foil to above its liquidus temperature.

12. The method of joining two pieces of silicon carbide by vacuum brazing at 1350° C. using the foil of claim 7.

* * * * *